US010845971B2

(12) United States Patent
Hewitt et al.

(10) Patent No.: US 10,845,971 B2
(45) Date of Patent: Nov. 24, 2020

(54) GENERATING DISPLAY REGIONS IN A DISPLAY SCREEN FOR MULTI-DIRECTIONAL VIEWING

(71) Applicant: International Business Machines Corporation, Armonk, NY (US)

(72) Inventors: Trudy L. Hewitt, Cary, NC (US); Jana H. Jenkins, Raleigh, NC (US); Jeremy R. Fox, Georgetown, TX (US); John Rice, Tramore (IE)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 15/922,807

(22) Filed: Mar. 15, 2018

(65) Prior Publication Data

US 2019/0286303 A1    Sep. 19, 2019

(51) Int. Cl.
| | |
|---|---|
| *G06F 3/0484* | (2013.01) |
| *G09G 5/00* | (2006.01) |
| *G06T 11/60* | (2006.01) |
| *G06F 3/16* | (2006.01) |
| *G06K 9/00* | (2006.01) |
| *H04N 5/262* | (2006.01) |

(52) U.S. Cl.
CPC .......... *G06F 3/04845* (2013.01); *G06F 3/167* (2013.01); *G06K 9/00248* (2013.01); *G06T 11/60* (2013.01); *G09G 5/00* (2013.01); *H04N 5/2628* (2013.01); *G06F 2203/04803* (2013.01); *G09G 2340/0492* (2013.01)

(58) Field of Classification Search
CPC ...... G06F 3/04845; G06F 2203/04803; G09G 5/00
See application file for complete search history.

(56) References Cited

U.S. PATENT DOCUMENTS

| | | |
|---|---|---|
| 6,310,631 B1 | 10/2001 | Cecco et al. |
| 2009/0244376 A1 | 10/2009 | Asano et al. |

(Continued)

OTHER PUBLICATIONS

"Android N Quick-Tip: How to Activate Split-Screen Multitasking Mode" dated May 4, 2016, (online), retrieved from the Internet at URL> https://9to5google.com/2016/05/04/how-to-multiwindow-android-n-split- . . . 2, Total 11 pages.

(Continued)

*Primary Examiner* — Matthew Salvucci
(74) *Attorney, Agent, or Firm* — David W. Victor; Konrad, Raynes, Davda and Victor LLP

(57) ABSTRACT

Provided are a computer program product, system, and method for generating display regions in a display screen for multi-directional viewing. A plurality of display regions are determined to render on the display screen view the display regions. A determination is made, for each display region of the display regions, of an orientation at which to render content within the display region with respect to one of a plurality of edges of the display screen. At least two display regions render content at different orientations with respect to different edges. Each display region is rendered to be adjacent to one of the edges of the display screen. At least two of the display regions are adjacent to different edges of the display screen. The content is rendered in each of the display regions to be oriented according to the determined orientation for the display region.

22 Claims, 9 Drawing Sheets

(56) References Cited

U.S. PATENT DOCUMENTS

| | | | |
|---|---|---|---|
| 2012/0056876 A1* | 3/2012 | Lee | H04N 13/122 |
| | | | 345/419 |
| 2012/0081313 A1 | 4/2012 | Sirpal et al. | |
| 2013/0017526 A1* | 1/2013 | Nguyen | G09B 7/02 |
| | | | 434/362 |
| 2013/0234927 A1 | 9/2013 | Roh | |
| 2015/0170327 A1* | 6/2015 | Feldman | G06F 3/038 |
| | | | 345/520 |

OTHER PUBLICATIONS

O. Obaiza, "How to Change Your Android Screen's Orientation Using Your Face Instead of the Device's Angle" dated Jan. 17, 2013, Smartphones Gadget Hacks, Total 5 pages.

"How to Split Your Laptop or PC Screen/Monitor in Windows" (online) retrieved from the Internet on Feb. 25, 2018, at URL>https://www.online-tech-tips.com/computer-tips/how-to-split-your-laptop . . . , Total 6 pages.

"The Screen Orientation API" dated Nov. 2017, W3C Editor's Draft Nov. 5, 2017, (online) retrieved from the Internet at URL>https://w3c.github.io/screen-orientation/#orientationlocktype-enum; Total 10 pages.

"Use Two Mac Apps Side by Side in Split View" Apple Support, (online), retrieved from the Internet on Feb. 25, 2018 at URL>https://support.apple.com/en-us/HT204948, Total 3 pages.

G. Gruman, "Visual Guide :The iPad's New Split-Screen Multitasking", dated Sep. 29, 2015, (online) retrieved from the Internet on Feb. 25, 2018 at URL>https://www.computerworld.com/article/3218117/apple-ios/visual-guide- . . . ,Total 5 pages.

\* cited by examiner

| Name | Portable Device ID | Photo | Preferred Language | Preferred Scrolling Rate |

202 · 204 · 206 · 208 · 210 · 200ᵢ

Person Profile Information

| Display Region ID | Display Region Coordinates on Screen | Content Orientation |

302 · 304 · 306 · 300ᵢ

Display Region Information

GENERATING DISPLAY REGIONS IN A DISPLAY SCREEN FOR MULTI-DIRECTIONAL VIEWING

BACKGROUND OF THE INVENTION

1. Field of the Invention

The present invention relates to a computer program product, system, and method for generating display regions in a display screen for multi-directional viewing.

2. Description of the Related Art

A user of a personal computing device, such as a tablet, smartphone, etc., may want to share content displayed on their screen with other viewers nearby. However, other viewers surrounding the smartphone, tablet or other personal computing device may have difficulty viewing the content from their point-of-view, which may be at a different orientation with respect to the content orientation, such as viewing the phone from one side, while the content is rendered oriented toward the opposite side.

There is a need in the art for developing improved techniques for displaying content on a personal computing device to share with multiple viewers viewing the content from multiple directions.

SUMMARY

Provided are a computer program product, system, and method for generating display regions in a display screen for multi-directional viewing. A plurality of display regions are determined to render on the display screen for users to view the display regions. A determination is made, for each display region of the display regions, of an orientation at which to render content within the display region with respect to one of a plurality of edges of the display screen. At least two display regions render content at different orientations with respect to different edges of the display screen. Each display region of the plurality of display regions is rendered to be adjacent to one of the edges of the display screen, wherein at least two of the display regions are adjacent to different edges of the display screen. The content is rendered in each of the display regions to be oriented according to the determined orientation for the display region.

DETAILED DESCRIPTION

With current smartphone and tablet devices, a user of the device may have difficulty sharing the content on the display screen with multiple viewers who are viewing the display screen from different locations. For instance, the content on the display screen may appear upside down or rotated for the viewers viewing the screen from different positions and directions.

Described embodiments provide improvements to the display technology for a personal computing device to generate multiple display regions for the viewers that are viewing the content from different directions with respect to the personal computing device. With described embodiments, the display regions to render are determined through user input or by automatically detecting proximate viewers using facial recognition technology or communication interface technology. A determination is made for each of the display regions of an orientation at which to render content within the display regions with respect to one of the edges of the display screen. Multiple of the display regions may render content at different orientations with respect to different edges of the display screen to allow the viewers to view the content from different directions in the intended orientation of the content with respect to their point-of-view. In this way, the described embodiments provide improvements to the technology for rendering content in a display screen of a personal computing device.

Figure 1:
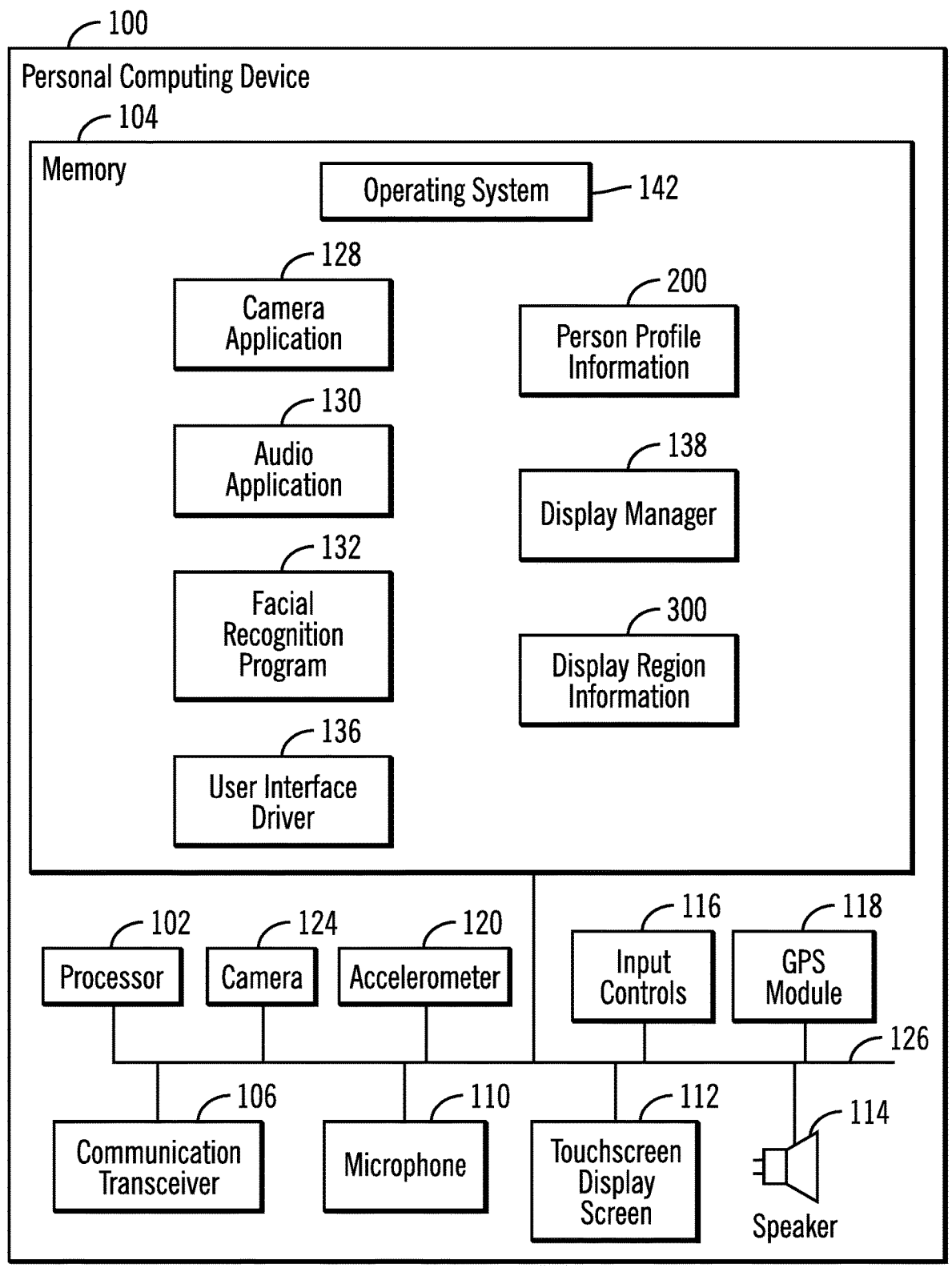
FIG. 1 illustrates an embodiment of a personal computing device.

FIG. 1 illustrates an embodiment of a personal computing device 100 to allow for multi-directional viewing of an image. The personal computing device 100 includes a processor 102, a main memory 104, a communication transceiver 106 to communicate (via wireless communication or a wired connection) with external devices, including a network, such as the Internet, a cellular network, etc.; a microphone 110 to receive as input sound external to the personal computing device 100; a touchscreen display screen 112 to render display output to a user of the personal computing device 100; a speaker 114 to generate sound output to the user; input controls 116 such as buttons and other software or mechanical buttons, including a keyboard, and a touchscreen controller and elements to receive user input; a global positioning system (GPS) module 118 to determine a GPS position of the personal computing device 100; an accelerometer 120 to sense the force of acceleration in the personal computing device 100 and sense an angle at which the personal computing device 100 is being held; and a camera 122. The components 102, 106, 110, 112, 114, 116, 118, 120, 124 may communicate over one or more bus interfaces 126, which includes hardware and circuitry to allow for intercommunication among the devices 102-124. The bus 126 may utilize one or more bus interface protocols to allow for some devices to communicate, but not all devices to communicate with each other or allow for all devices to communicate with each other.

The main memory 104 may include various program components including a camera application 128, having camera 124 hardware drivers, to control the camera 124 to take pictures; an audio application 130, having drivers, to control the speaker 114 and microphone 110; a facial recognition program 132 to identify faces and verify and identify particular people, whose personal information and images may be maintained in person profile information 200; a user interface driver 136 to manage communication with the input controls 116 and the touchscreen display 112; and a display manager 138 to manage the presentation of content on the display screen 112, which may use information from the accelerometer 120 to determine an orientation at which to render text on the screen 112 with respect to the movement of the computing device 100. The display manager 138 maintains display region information 300 having information on different display regions to be rendered on the display screen 112 for multidirectional viewing by different users.

The main memory 104 may further include an operating system 142 to manage the personal computing device 100 operations and interface with device components 102, 106, 110, 112, 114, 116, 118, 120, etc.

The personal computing device 100 may comprise a smart phone, personal digital assistance (PDA), laptop or stationary computing device capable to process audio and voice detected by the microphone 110. In alternative embodiments, the device 100 may comprise a desktop computer or a device in a fixed location, such as a screen built into a table, pedestal, wall, etc., which viewers can view from different directions The memory 104 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAIVI), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

The bus 126 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Generally, program modules, such as the program components 128, 130, 132, 136, 138, 142, etc., may comprise routines, programs, objects, components, logic, data structures, and so on that perform particular tasks or implement particular abstract data types. The program modules may be practiced in distributed cloud computing environments where tasks are performed by remote processing devices that are linked through a communications network. In a distributed cloud computing environment, program modules may be located in both local and remote computer system storage media including memory storage devices.

The program components and hardware devices of the personal computing device 100 of FIG. 1 may be implemented in one or more computer systems, where if they are implemented in multiple computer systems, then the computer systems may communicate over a network.

The program components 128, 130, 132, 136, 138, 142 may be accessed by the processor 102 from the memory 104 to execute. Alternatively, some or all of the program components 128, 130, 132, 136, 138, 142, may be implemented in separate hardware devices, such as Application Specific Integrated Circuit (ASIC) hardware devices.

The functions described as performed by the program components 128, 130, 132, 136, 138, 142 may be implemented as program code in fewer program modules than shown or implemented as program code throughout a greater number of program modules than shown.

Figures 2, 3, 4:
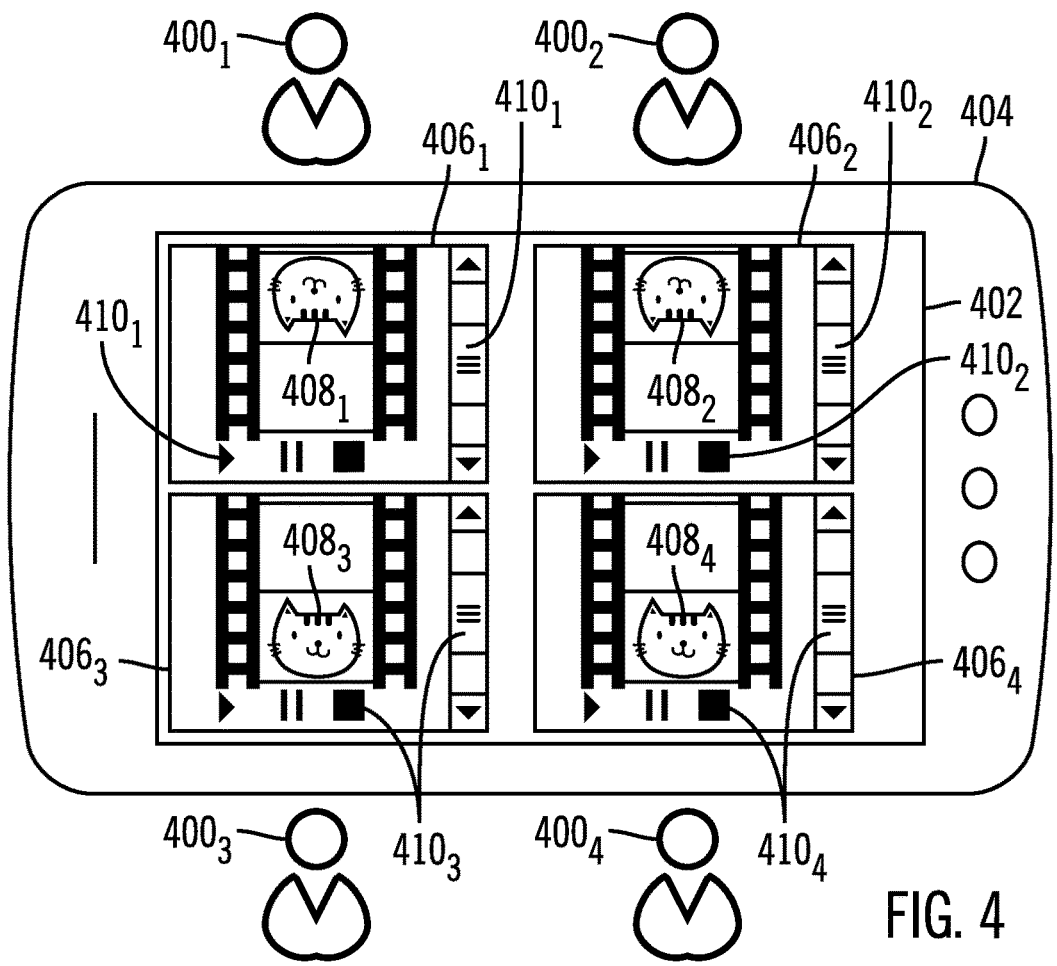
FIG. 2 illustrates an embodiment of person profile information.
FIG. 3 illustrates an embodiment of display region information.
FIGS. 4, 5, and 6 illustrate embodiments of layouts of display regions on a screen of a personal computing device.

FIG. 2 illustrates an embodiment of an instance $200_i$ of person profile information including a person name 202 or other identifier; a portable (or non-portable) device ID 204 of a device used by the person, such as a broadcasted universal ID, network address, etc., of the smartphone or other device of the person; a photo 206 of the person; a preferred language 208 in which the person 202 prefers content; and a preferred scrolling rate 210 at which the person 202 prefers to have content, such as text, automatically scrolled on the display screen 112.

FIG. 3 illustrates an embodiment of an instance $300_i$ of display region information for one of multiple display regions to be rendered on the display screen 112, and includes a display region identifier 302; display region coordinates 304 defining an area of the display screen 112 in which the particular region is rendered; and content orientation 306 indicating an orientation in which the content is rendered in the display region, such as whether aligned in the display region, such that the top and bottom orientation of the content are at the top and bottom of the display region with respect to a user point-of-view.

Figure 5:
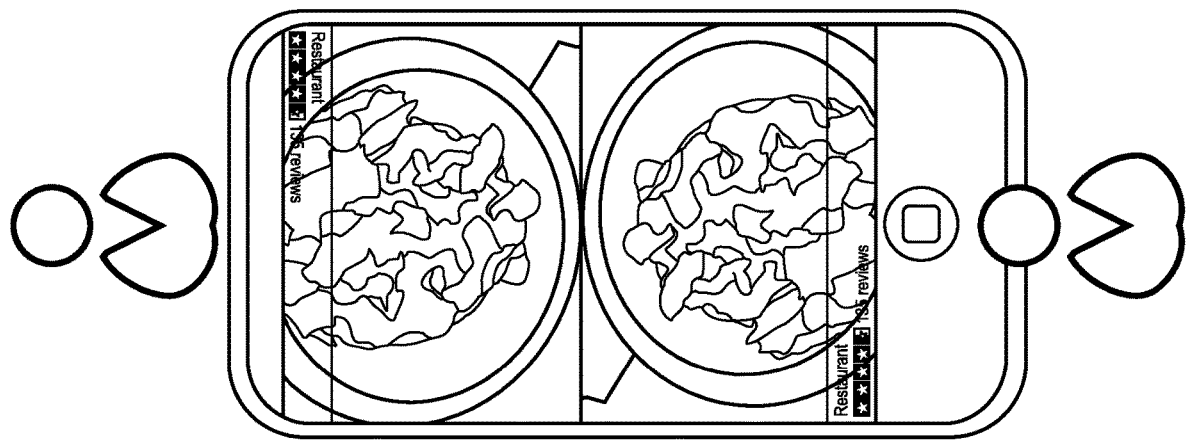
Figure 6:
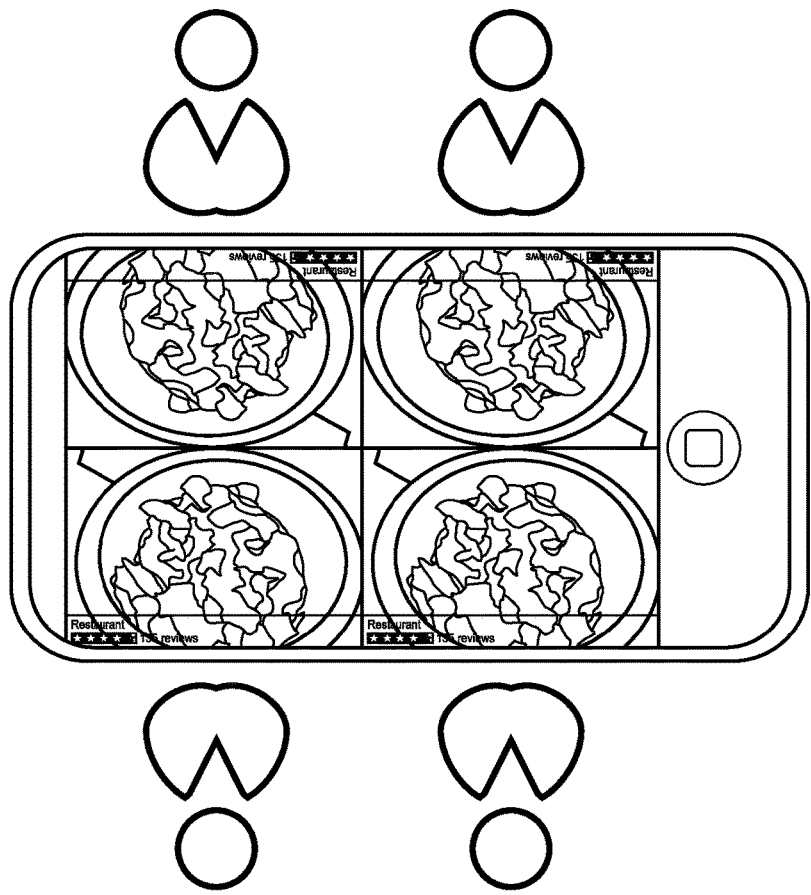

FIGS. 4-6 provide embodiments of multi-directional viewing. With respect to FIG. 4, viewers $400_1$, $400_2$, $400_3$, and $400_4$ are viewing the display screen 402 of a computing device 404 at different locations round the computing device 404. The display screen 402 is divided into a plurality of display regions $406_1$, $406_2$, $406_3$, and $406_4$, one region for the each of the viewers $400_1$, $400_2$, $400_3$, and $400_4$. In each of the display regions $406_1$, $406_2$, $406_3$, and $406_4$, the same content $408_1$, $408_2$, $408_3$, and $408_4$ is rendered. Each display region $406_1$, $406_2$, $406_3$, and $406_4$ may include separate user controls $410_1$, $410_2$, $410_3$, and $410_4$, to allow each viewer $400_1$, $400_2$, $400_3$, and $400_4$ to independently manipulate the content $408_1$, $408_2$, $408_3$, and $408_4$, such as scroll, pause, fast forward, reverse, etc. Further, the orientation of content $408_1$, $408_2$, $408_3$, and $408_4$ in each display region $406_1$, $406_2$, $406_3$, and $406_4$ is oriented toward the viewers $400_1$, $400_2$, $400_3$, and $400_4$ in the line of sight of the display region $406_1$, $406_2$, $406_3$, and $406_4$.

FIG. 5 illustrates an example where the personal computing device splits the screen into two display regions to render the content toward the orientation of two users viewing the device from opposite ends.

FIG. 6 illustrates an example where the personal computing device splits the screen into four display regions to render the content toward the orientation of four users viewing the device from four locations around the phone.

Figure 7:
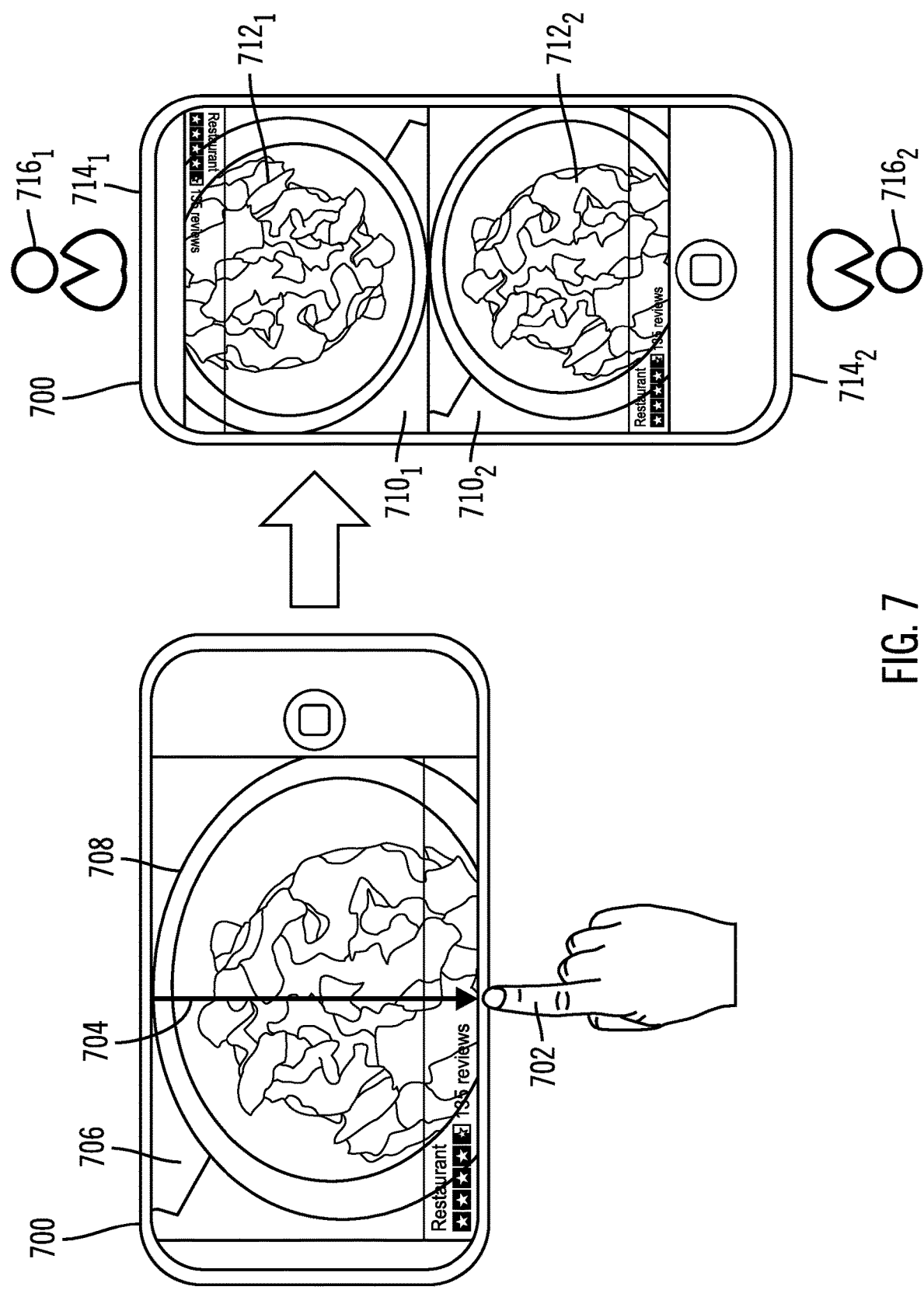
FIGS. 7 and 8 illustrate embodiments for a user to enter input on a touchscreen display to form display regions on the screen display.

FIG. 7 illustrates an example where a user of the personal computing device 700 uses their finger 702 to draw a line 704 across the middle of the touchscreen display 706 rendering an image 708 to cause the personal computing device 700 to divide the display 706 into two viewing display regions $710_1$, $710_2$ to orient the content $712_1$, $712_2$ toward the opposite edges $714_1$, $714_2$ of the phone for viewers $716_1$, $716_2$ whose line of sight would be toward the edges $714_1$, $714_2$, i.e., the closest edge $714_1$, $714_2$ to the line of sight of the viewers $716_1$, $716_2$ are the edges $714_1$, $714_2$, respectively.

Figure 8:
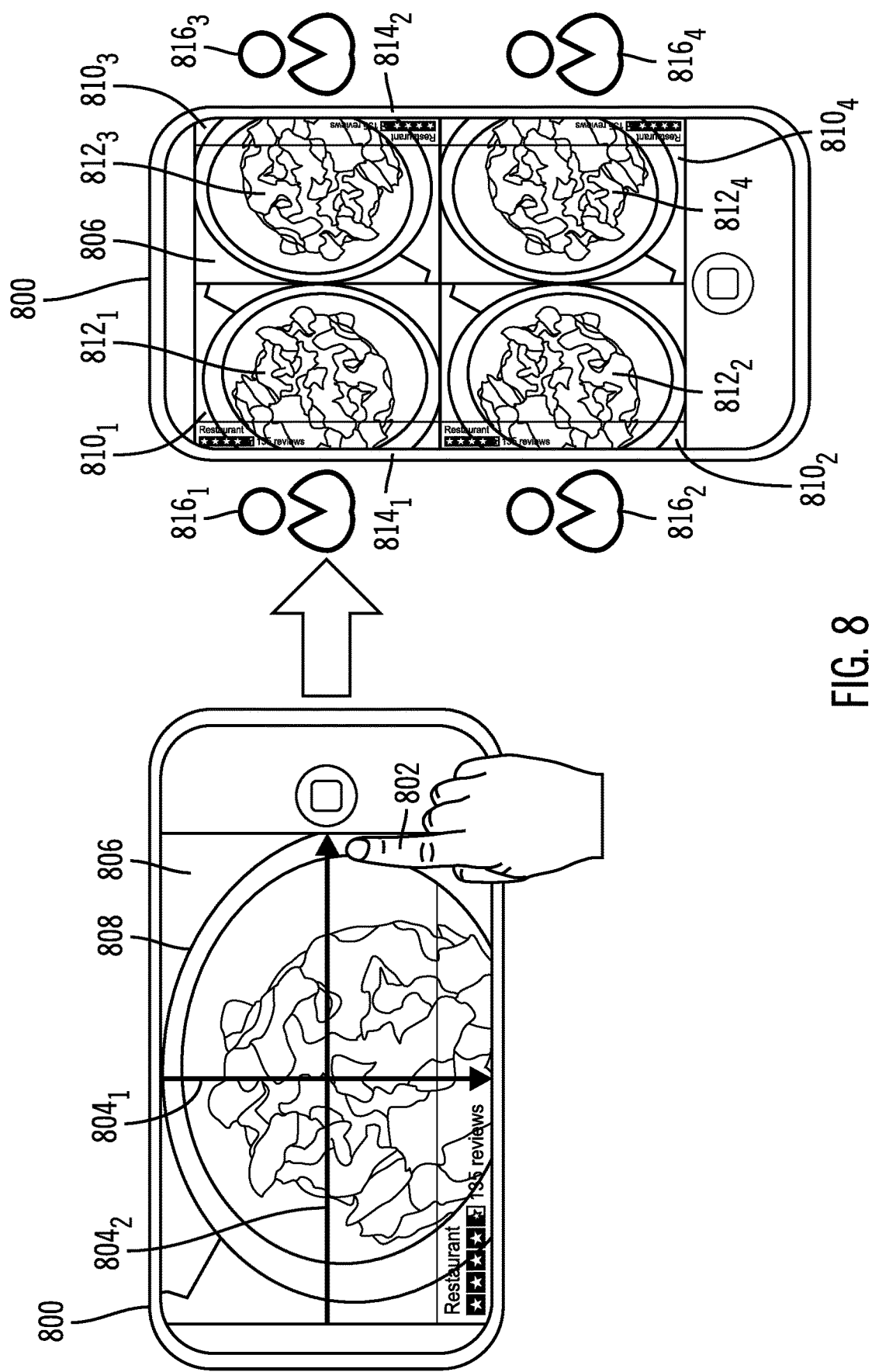

FIG. 8 illustrates an example where a user of the personal computing device 800 uses their finger 802 to draw two perpendicular lines $804_1$, $804_2$ that cross at the middle of the touchscreen display 806 rendering an image 808 to cause the personal computing device 800 to divide the display 806 into four viewing display regions $810_1$, $810_2$, $810_3$, $801_4$ to orient the content $812_1$, $812_2$, $812_3$, $814_4$ toward the edges $814_1$, $814_2$ of the device 800 for viewers $816_1$, $816_2$, $816_3$, $816_4$ whose line of sight would be toward the edges $814_1$, $814_2$, i.e., the closest edges $814_1$, $814_2$ to the line of sights of the viewers $816_1$, $816_2$ and viewers $816_3$, $816_4$ are the edges $814_1$, $814_2$, respectively.

Figure 9:
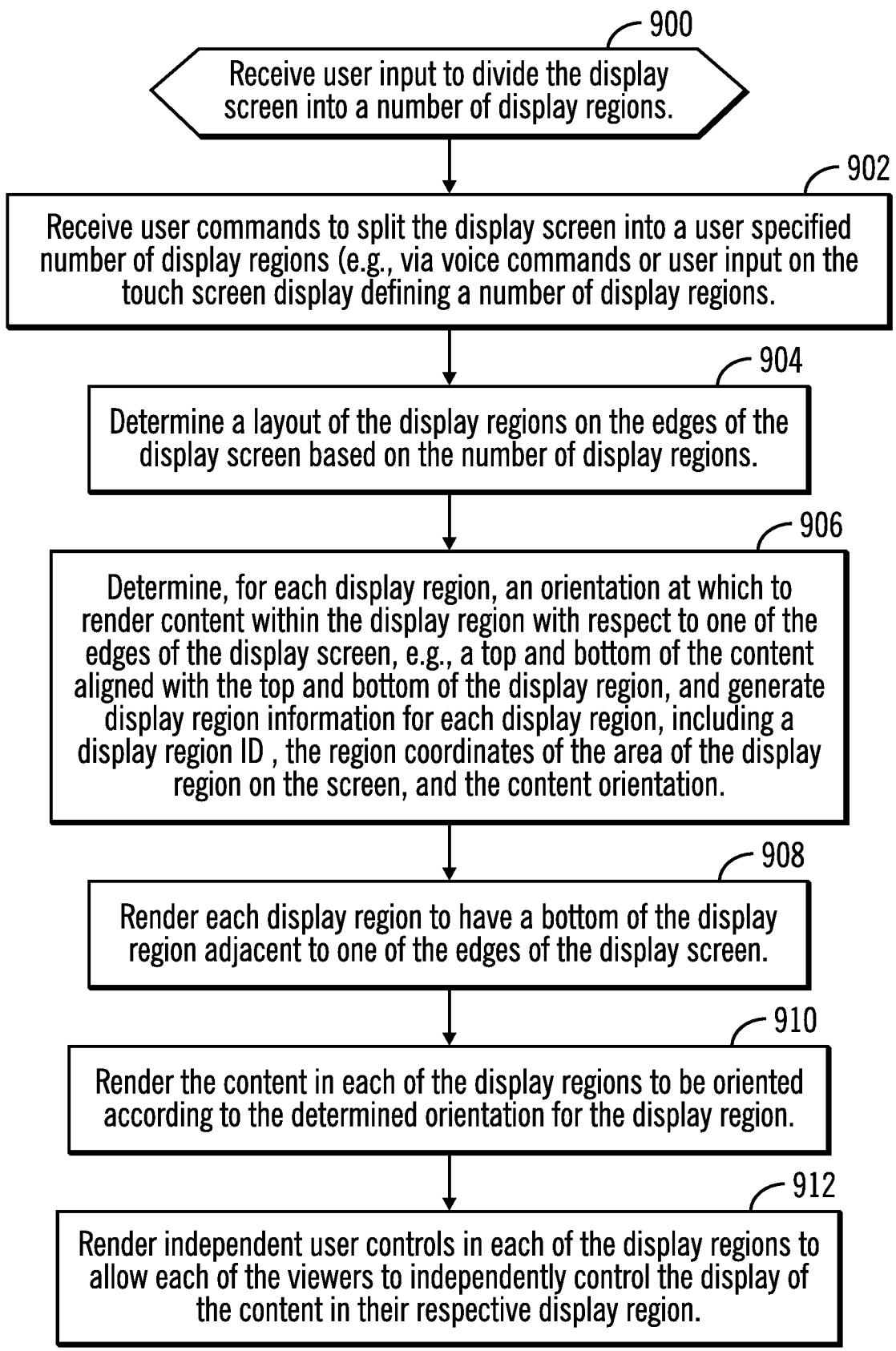
FIG. 9 illustrates an embodiment of operations to receive user input to divide the display screen into a number of display regions.

FIG. 9 illustrates an embodiment of operations performed by the display manager 138 to divide the display screen 402 (FIG. 4) into a number of display regions $406_i$ based on user input as to the number of display regions to create. Upon receiving (at block 900) user input to divide the display, the display manager 138 receives (at block 902) user commands to split the display screen into a user specified number of display regions $406_i$, e.g., via voice commands via the microphone 110 or user input on the touchscreen display 112, defining a number of display regions. The display manager 138 determines (at block 904) a layout of the display regions $406_i$ on edges of the display screen 112 based on the number of user entered display regions. For each display region $406_i$, a determination is made (at block 906) of an orientation at which to render content $408_i$ within the display region $406_i$ with respect to one of the edges of the display screen 402, e.g., a top and bottom of the content aligned with the top and bottom of the display region. Display region information $300_i$ is generated for each of the display regions $406_i$ in the layout, including a display region ID 302, the region coordinates 304 of the area of the display region $406_i$ on the screen 402, and the determined content orientation 306.

The display manager 138 renders (at block 908) each display region $406_i$ to have a bottom of the display region adjacent to one of the edges of the display screen 112. Each display region $406_i$ may be set to be a percentage of the display screen based on the number of display regions such that all of the display regions occupy a same percentage of the display screen 112 and have different orientations on the display screen. Alternatively, the display regions may occupy different size areas of the display screen 112. The content $408_i$ is rendered (at block 910) in each of the display regions $406_i$ to be oriented according to the determined orientation 306 for the display region $406_i$. The display manager 138 further renders (at block 910) independent user controls $410_i$ in each of the display regions $406_i$ to allow each of the viewers $400_i$ to independently control the display of the content in their respective display region $406_i$.

With the embodiment of FIG. 9, the user of the device 100 may enter input to divide the screen into a number of display regions, one for each viewer, to allow viewers to have an optimal view of the display region for their location and position with respect to the computing device 100, and independent user controls by which they each can independently control the content rendered in their display region. Described embodiments provide improvements to user interface technology to allow the user of the computing device 100 to share an image with multiple viewers gathered around the device to allow them to view the image oriented toward their line of sight without having to change their position or contort themselves to view. Further, providing each of the viewers $400_i$ their own independent user controls $410_i$, allows each viewer $400_i$ to independently control the rendering of the content, such as scroll through text, control the rate at which video is played, etc.

In further, embodiments, the user of the personal computing device 100 may have user controls $410_i$ that allow them to control the rendering of the content in each of the display regions $406_i$ at the same rate for all the viewers, such as control the playing of a video so all viewers are in synch with what the user wants to present.

Figure 10:
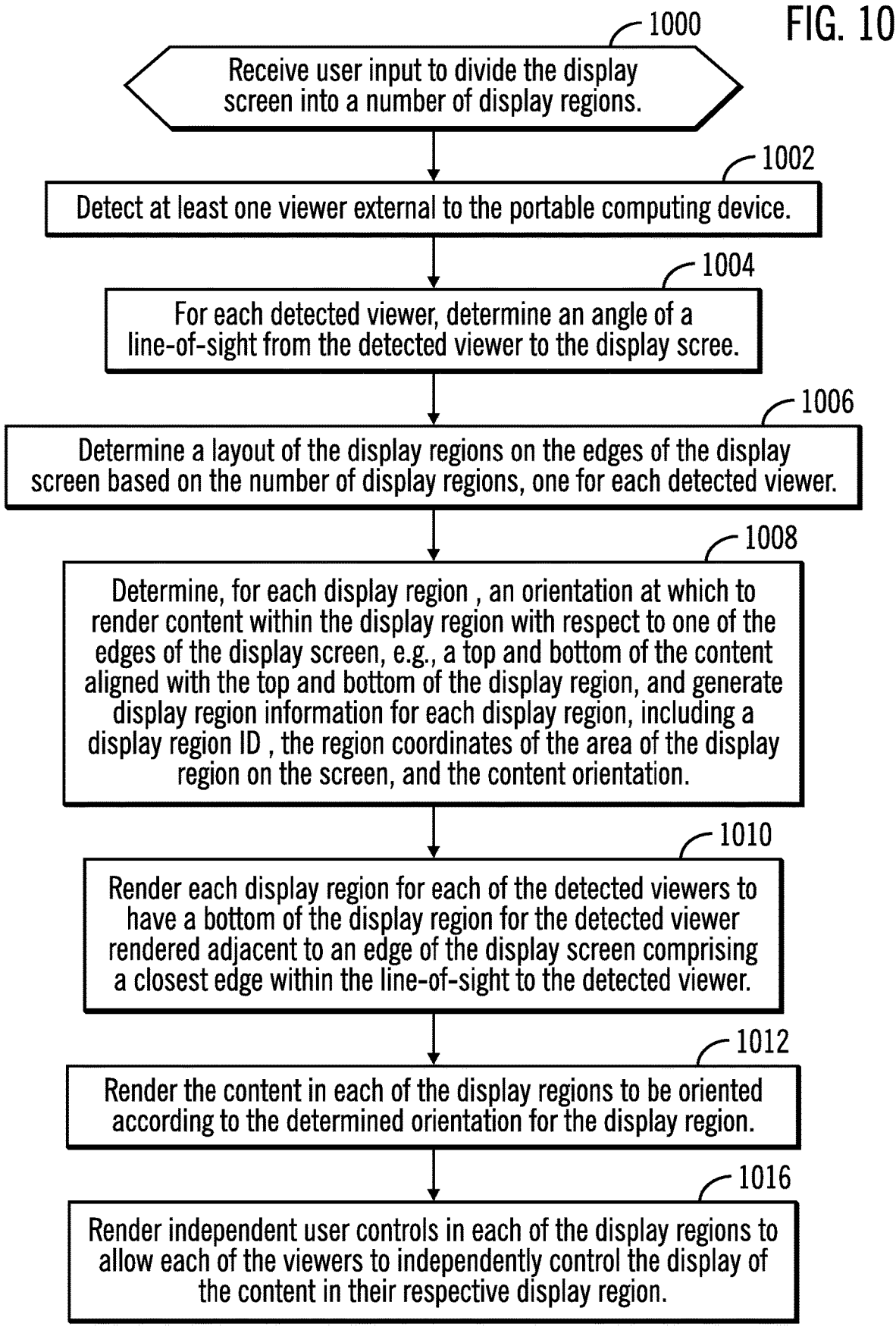
FIG. 10 illustrates an embodiment of operations to detect proximate viewers and generate display regions for the detected proximate viewers.

FIG. 10 illustrates an embodiment of operations performed by the display manager 138 to divide the display screen 402 (FIG. 4) into a number of display regions $406_i$ based on detecting viewers in the vicinity of the computing device 100, 400. Upon receiving (at block 1000) user input to divide the display screen 112 into a number of display regions $406i$, the display manager 138 detects (at block 1002) at least one viewer external to the portable computing devices 100, 404, preferably within a viewing range. The portable computing device 100, 404 may detect proximate viewers by using the camera 124 to take a picture or video of a region around the device 100, 404, such as a panorama 360 degree perspective and then use the facial recognition program 132 to identify faces around the device 100, 404 looking at the device. In alternative embodiments, the device 100, 404 may detect proximate viewers by detecting their portable computing devices, e.g., smartphones, etc., through the communication transceiver 106, such as through a Bluetooth® connection. (Bluetooth is a trademark throughout the world owned by Bluetooth Special Interest Group (SIG)). The detected viewers may be those determined to be within a maximum viewing distance of the device 100, 404.

For each detected viewer, the display manager 138 determines (at block 1004) an angle of a line-of-sight from the detected viewer to the display screen. This may be determined by determining a line from a front of a face detected through the facial recognition program 132 to an edge of the device 100, 404 or by determining a line from the detected device to a nearest edge of the device 100, 404. The display manager 138 determines (at block 1006) a layout of the display regions $406_i$ on the edges of the display screen 402 based on the number of display regions, one for each detected viewer. The display regions may each have an equal area of the display screen 402 area. The display manager 138 determines (at block 1008), for each display region $406_i$, an orientation at which to render content $408_i$ within the display region $406_i$ with respect to one of the edges of the display screen 402, e.g., a top and bottom of the content aligned with the top and bottom of the display region $406_i$. In further embodiments, the orientation of the content $408_i$ within a display region $406_i$ may change as the device 100, 404 is rotated, by detecting rotation through the accelerometer 120. Display region information $300_i$ is generated for each of the display regions $406i$ in the layout, including a display region ID 302, the region coordinates 304 of the area of the display region $406i$ on the screen 402, and the determined content orientation 306.

The display manager 138 renders (at block 1010) each display region $406_i$ for each of the detected viewers $400_i$ to have a bottom of the display region for the detected viewer rendered adjacent to an edge of the display screen 402 comprising a closest edge within the line-of-sight to the detected viewer $400_i$. The display manager 138 renders (at block 1012) the content $408_i$ in each of the display regions $406_i$ to be oriented according to the determined orientation 306 for the display region $406_i$. The display manager 138 further renders (at block 1016) independent user controls 410$_i$ in each of the display regions 406$_i$ to allow each of the viewers 400$_i$ to independently control the display of the content in their respective display region 406$_i$.

With the embodiment of FIG. 10, the computing device 100, 404 may detect, using the camera 124 or communication transceiver 106, proximate devices within viewing range of the display screen 112, 402, e.g., within a maximum viewing distance. The display manager 138 may then generate individual display regions onto the display screen to allow optimal viewing of content within the display regions for the different detected viewers viewing the screen from different directions and positions around the device 100, 404. Described embodiments provide improvements to user interface technology to allow the user of the computing device 100 to share an image with multiple viewers gathered around the phone to allow them to view the image oriented toward their line of sight without having to change their position or contort themselves to view. Further, providing each of the viewers 400$_i$ their own independent user controls 410$_i$, allows each viewer 400$_i$ to independently control the rendering of the content, such as scroll through text, control the rate at which video is played, etc.

Figure 11:
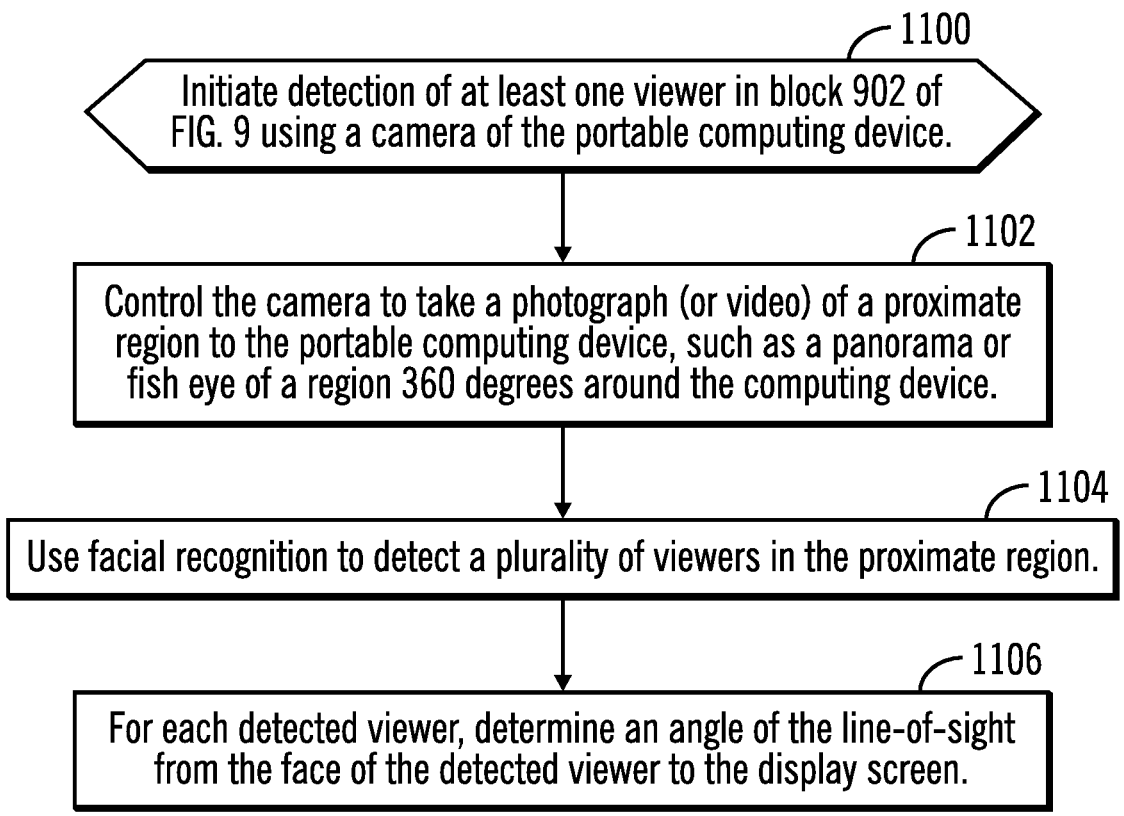
FIG. 11 illustrates an embodiment of operations to detect proximate viewers using a camera of the portable computing device.

FIG. 11 illustrates an embodiment of operations performed by the display manager 138 to detect proximate viewers using the camera 124 of the computing device 100. Upon initiating (at block 1100) an operation to detect proximate viewers using the camera 124, such as at block 902 of FIG. 9, the display manager 138 controls (at block 1102) the camera 124 to take a photograph of a proximate region to the portable computing device, such as a panorama or fish eye of a region 360 degrees around the computing device 100, 404. Alternatively, the camera 124 may take video of the proximate region. The facial recognition program 132 is used (at block 1104) to detect a plurality of viewers in the proximate region from the photograph. For each detected viewer, the display manager 138 (or other program) determines an angle of the line-of-sight from the face of the detected viewer to the display screen 402, such as to a closest edge of the display screen 402 from the perspective of the detected viewer.

Figure 12:
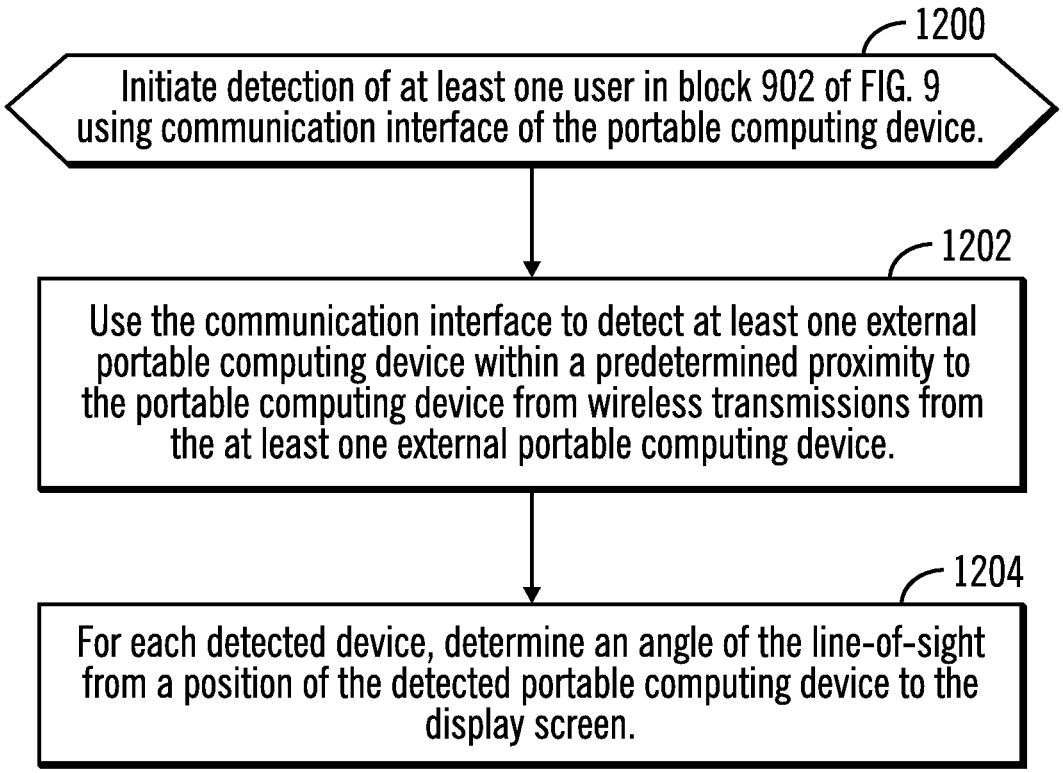
FIG. 12 illustrates an embodiment of operations to detect proximate viewers using a communication interface of the portable computing device.

The embodiment of FIG. 12 provides improved computer technology to automatically detect proximate viewers and use that information to generate display regions to provide improved viewing angles for the viewers with which the user of the computing device 100, 404 is sharing content. Upon initiating detection (at block 1200) of viewers, such as at block 902 in FIG. 9, the display manager 138 uses (at block 1202) the communication interface 106 to detect at least one external portable computing device within a predetermined proximity to the portable computing device from wireless transmissions from the at least one external portable computing device, such as Bluetooth® transmissions. For each detected device, the display manager 138 determines (at block 1204) an angle of the line-of-sight from a position of the detected portable computing device to the display screen 112, 402.

With the embodiment of FIG. 12, the portable computing device 100, 404 may detect proximate viewers by detecting their portable electronic devices. If the detected users are proximate, i.e., within a predefined range, then they may be determined to be viewers who are ready to view their generated display region on the screen 112, 402. In this way, the embodiment of FIG. 12 provides improved technology for generating a user interface to allow detected proximate viewers to better view a display screen by generating display regions for the automatically detected viewers that are within the line-of-sight of the detected viewers.

In alternative embodiments, other techniques may be used to detect proximate viewers, such as sonar, radar, GPS information on proximate viewers, information from remote cameras or drones, or other detection technologies available to the personal computing device 100, 404.

Figure 13:
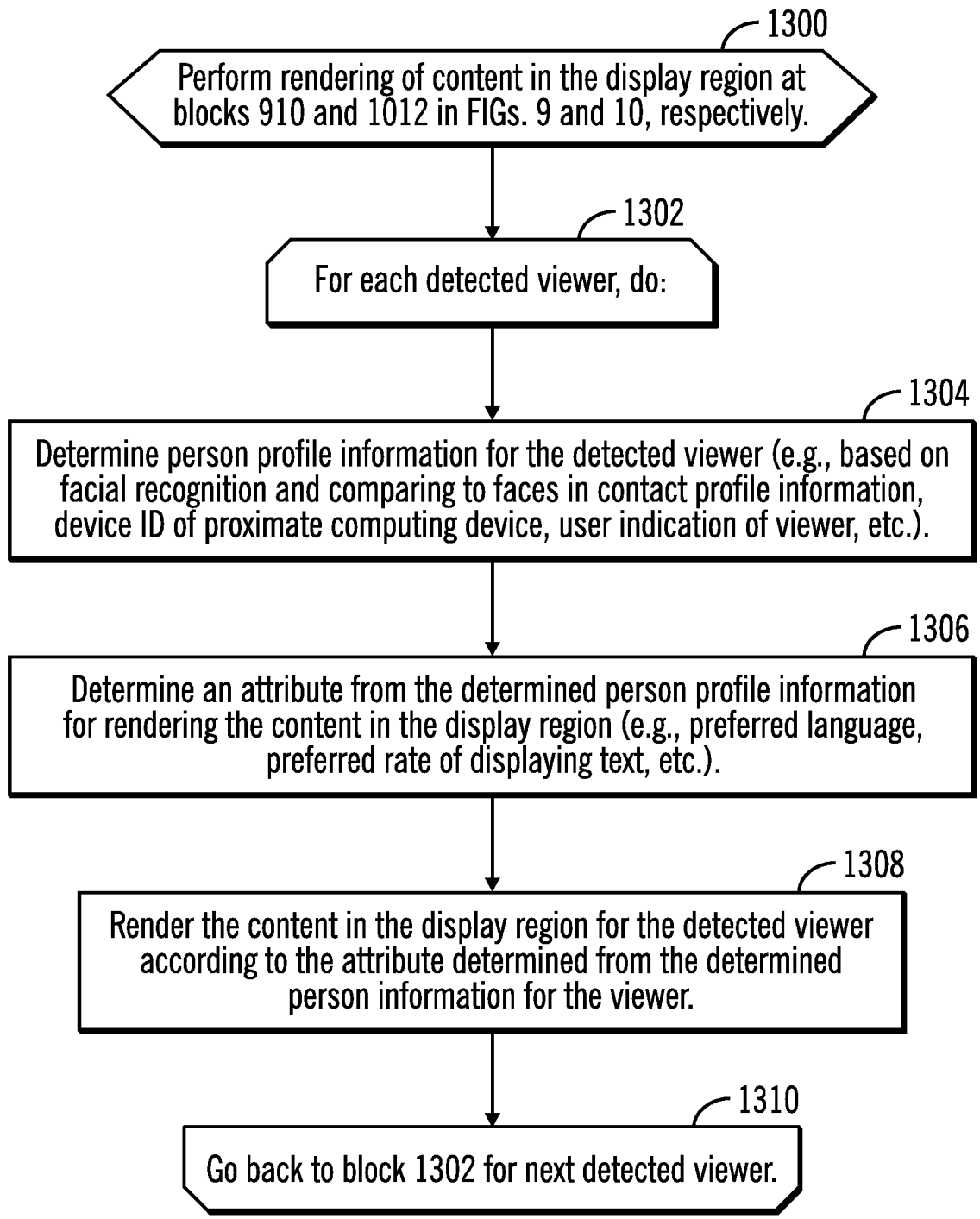
FIG. 13 illustrates an embodiment of operations to render content according to person profile information of the detected viewers.

FIG. 13 illustrates an embodiment of operations performed by the display manager 138 to render the content 408$_i$ in the display regions 406$_i$ such as performed at block 910 in FIG. 9 and block 1012 in FIG. 10. Upon performing (at block 1300) the operation to render content, the display manager 138 performs a loop of operations at blocks 1302 through 1310 for each detected viewer 400$_i$. The display manager 138 determines (at block 1304) person profile information for the detected viewer 400$_i$, such as by matching the detected face, detected with the facial recognition program 132, with a photo 206 in a person profile information 200$i$ instance, by finding a device identifier of the detected user matching the device ID 204 indicated in an instance of person profile information 200$_i$, user entry of the detected viewer, etc. The display manager 138 further determines (at block 1306) an attribute from the person profile information 200$i$ for rendering the content in the display region 406$_i$ for the viewer 400$_i$, such as a preferred language 208 in which to render content, e.g., text, audio, a preferred scrolling rate 210 at which to auto scroll the content 408$_i$, etc. The display manager 138 then renders (at block 1308) the content 408$_i$ in the display region for the detected viewer 400$_i$ according to the determined attribute, e.g., 208, 210, from the personal information 200$_i$ for the viewer.

The embodiment of FIG. 13 provides improved computer and user interface technology for tailoring the rendering of content based on the specific personal preferences of a detected user, such as a preferred language or rate at which to present the information. This improved computer technology improves the viewing experience and understanding of the content for the detected viewers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating a user interface in a computing device having a display screen in which to render content, the computer program product comprising a computer readable storage medium having computer readable program code embodied therein that executes to perform operations, the operations comprising:
    detecting a plurality of viewers external to the computing device;
    for each detected viewer of the detected viewers, determining an angle of a line-of-sight from the viewer to the display screen;
    determining a layout of display regions on edges of the display screen, one for each of the detected viewers;
    determining, for each display region of the display regions, an orientation at which to render content within the display region with respect to one of the edges of the display screen according to the layout, wherein at least two display regions render content at different orientations with respect to different edges of the display screen according to the layout;
    rendering each display region of the display regions for each of the detected viewers to be adjacent to one of the edges of the display screen comprising a closest edge within the line-of-sight to the detected viewer, wherein at least two of the display regions are adjacent to different edges of the display screen; and
    rendering the content in each of the display regions to be oriented according to the determined orientation for the display region.

2. The computer program product of claim 1, wherein the operations further comprise:
    rendering user interface controls in each of the display regions to allow user input for independent manipulation of the content in each of the display regions.

3. The computer program product of claim 1, wherein the operations further comprise:
    rendering group user interface controls in one of the display regions to simultaneously perform a same manipulation of the content in the display regions.

4. The computer program product of claim 1,
    wherein each of the display regions occupy a same percentage of the display screen, and wherein the display regions have different orientations on the display screen.

5. The computer program product of claim 1 wherein the detecting the viewers comprises:
    using a camera of the computing device to take a photograph of a proximate region to the computing device; and
    using facial recognition to detect the viewers in the proximate region, wherein the determined angle of the line-of-sight is determined from a face of each of the detected viewers to the display screen.

6. The computer program product of claim 1, wherein the detecting the viewers comprises:
    detecting at least one external portable computing device within a predetermined proximity to the computing device from wireless transmissions from the at least one external portable computing device, wherein the determined angle of the line-of-sight is determined from a position of the detected at least one external portable computing device to the display screen.

7. The computer program product of claim 1, wherein the operations further comprise:
    determining person profile information for a detected viewer of the detected viewers;
    determining an attribute from the determined person profile information for rendering the content in the display region; and
    rendering the content in the display region for the detected viewer according to the attribute determined from the determined person profile information for the detected viewer.

8. The computer program product of claim 7, wherein the determined attribute for rendering content from the determined person profile information for the detected viewer comprises at least one of:
    a language in which to render the content for the detected viewer; and
    a rate at which to render content based on a preferred rate indicated in the determined person profile information for the detected viewer.

9. The computer program product of claim 1, wherein the determining the orientation at which to render the content comprises:
    determining an angle of a line of sight from a detected viewer to an edge of the computing device, wherein the orientation is aligned on the determined angle to render the content at the determined angle.

10. A system, comprising:
    a display screen in which to render content and a user interface;
    a processor;
    a computer readable storage medium having computer readable program code executed by the processor to perform operations, the operations comprising:
    detecting a plurality of viewers external to the system;
    for each detected viewer of the detected viewers, determining an angle of a line-of-sight from the viewer to the display screen;
    determining a layout of display regions on edges of the display screen, one for each of the detected viewers;
    determining, for each display region of the display regions, an orientation at which to render content within the display region with respect to one of the edges of the display screen according to the layout, wherein at least two display regions render content at different orientations with respect to different edges of the display screen according to the layout;
    rendering each display region of the display regions for each of the detected viewers to be adjacent to one of the edges of the display screen, wherein at least two of the display regions are adjacent to different edges of the display screen comprising a closest edge within the line-of-sight to the detected viewer; and rendering the content in each of the display regions to be oriented according to the determined orientation for the display region.

11. The system of claim 10, wherein the operations further comprise:

rendering user interface controls in each of the display regions to allow user input for independent manipulation of the content in each of the display regions.

12. The system of claim 10, wherein the operations further comprise:

rendering group user interface controls in one of the display regions to simultaneously perform a same manipulation of the content in the display regions.

13. The system of claim 10 wherein the detecting the viewers comprises:

using a camera of the system to take a photograph of a proximate region to the system; and using facial recognition to detect the viewers in the proximate region, wherein the determined angle of the line-of-sight is determined from a face of each of the detected viewers to the display screen.

14. The system of claim 10, wherein the detecting the viewers comprises:

detecting at least one external portable computing device within a predetermined proximity to the system from wireless transmissions from the at least one external portable computing device, wherein the determined angle of the line-of-sight is determined from a position of the detected at least one external portable computing device to the display screen.

15. The system of claim 10, wherein the operations further comprise:

determining person profile information for a detected viewer of the detected viewers;

determining an attribute from the determined person profile information for rendering the content in the display region; and rendering the content in the display region for the detected viewer according to the attribute determined from the determined person profile information for the detected viewer.

16. The system of claim 15, wherein the determined attribute for rendering content from the determined person profile information for the detected viewer comprises at least one of:

a language in which to render the content for the detected viewer; and a rate at which to render content based on a preferred rate indicated in the determined person profile information for the detected viewer.

17. A method for generating a user interface in a computing device having a display screen in which to render content, comprising:

detecting a plurality of viewers external to the computing device;

for each detected viewer of the detected viewers, determining an angle of a line-of-sight from the viewer to the display screen;

determining a layout of display regions on edges of the display screen, one for each of the detected viewers;

determining, for each display region of the display regions, an orientation at which to render content within the display region with respect to one of the edges of the display screen according to the layout, wherein at least two display regions render content at different orientations with respect to different edges of the display screen according to the layout;

rendering each display region of the display regions for each of the detected viewers to be adjacent to one of the edges of the display screen comprising a closest edge within the line-of-sight to the detected viewer, wherein at least two of the display regions are adjacent to different edges of the display screen; and rendering the content in each of the display regions to be oriented according to the determined orientation for the display region.

18. The method of claim 17, further comprising:

rendering user interface controls in each of the display regions to allow user input for independent manipulation of the content in each of the display regions.

19. The method of claim 17, wherein the detecting the viewers comprises:

using a camera of the computing device to take a photograph of a proximate region to the computing device; and using facial recognition to detect the viewers in the proximate region, wherein the determined angle of the line-of-sight is determined from a face of each of the detected viewers to the display screen.

20. The method of claim 17, wherein the detecting the viewers comprises:

detecting at least one external portable computing device within a predetermined proximity to the computing device from wireless transmissions from the at least one external computing device, wherein the determined angle of the line-of-sight is determined from a position of the at least one detected external portable computing device to the display screen.

21. The method of claim 17, further comprising:

determining person profile information for a detected viewer of the detected viewers;

determining an attribute from the determined person profile information for rendering the content in the display region; and rendering the content in the display region for the detected viewer according to the attribute determined from the determined person profile information for the detected viewer.

22. The method of claim 21, wherein the determined attribute for rendering content from the determined person profile information for the detected viewer comprises at least one of:

a language in which to render the content for the detected viewer; and a rate at which to render content based on a preferred rate indicated in the determined person profile information for the detected viewer.

* * * * *